Dec. 23, 1969  ZYOICHI FUWA  3,485,152
PHOTOGRAPHIC CAMERA INCORPORATING A BATTERY CHARGER
Filed March 1, 1967
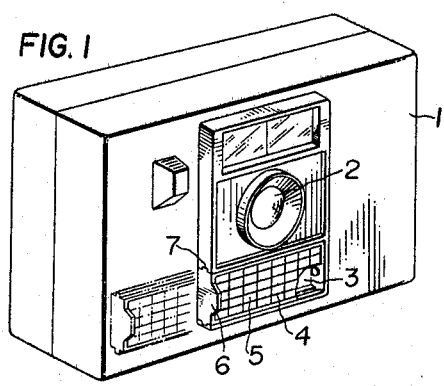
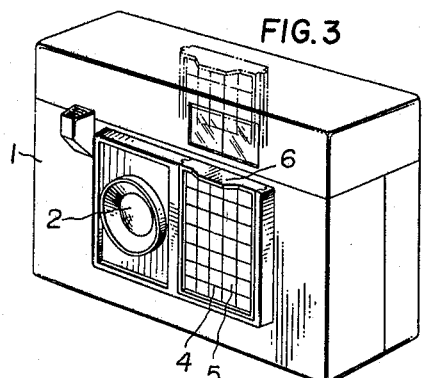
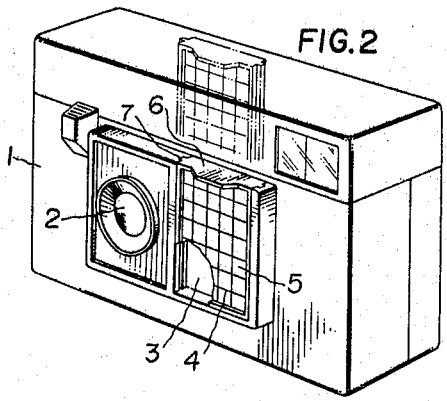
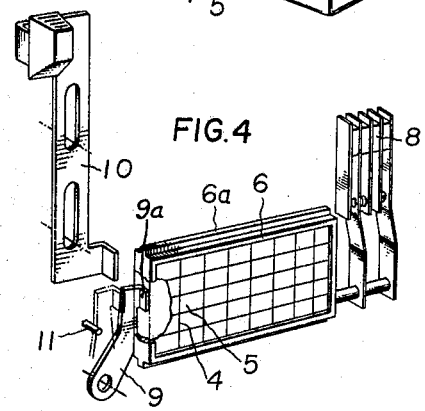
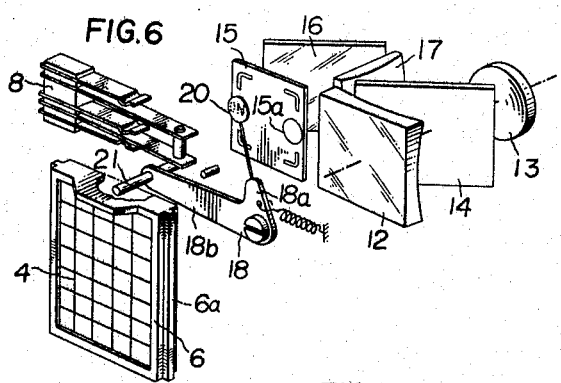
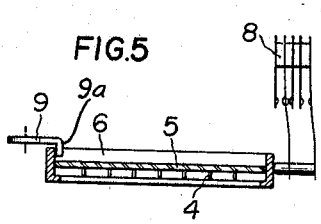
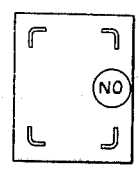
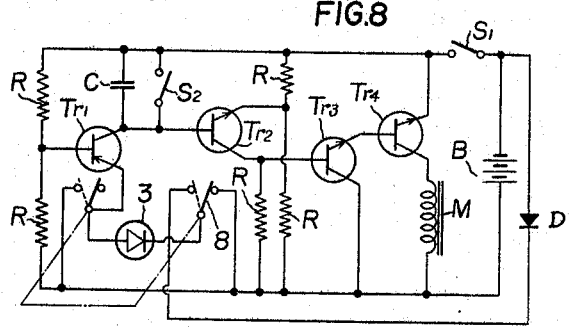

United States Patent Office 3,485,152
Patented Dec. 23, 1969

3,485,152
PHOTOGRAPHIC CAMERA INCORPORATING A BATTERY CHARGER
Zyoichi Fuwa, Machida-shi, Tokyo, Japan, assignor to Kabushiki Kaisha Ricoh, Tokyo, Japan, a corporation of Japan
Filed Mar. 1, 1967, Ser. No. 619,820
Claims priority, application Japan, Mar. 5, 1966, 41/13,414
Int. Cl. G01j 1/00, 1/52; G03b 9/70
U.S. Cl. 95—10     6 Claims

ABSTRACT OF THE DISCLOSURE

A camera equipped with an electric shutter, a photoelectric cell for controlling said shutter, a grid and filter for the cell, a battery to supply current to the shutter mechanism, and a switching mechanism for selectively connecting the cell to the shutter mechanism to thereby control the exposure time of the camera, and to the battery for recharging it. The grid and filter cooperates with the switching mechanism to connect the cell to the shutter mechanism when the filter is in the operative position in front of the cell, and to the battery when the filter is moved to the inoperative position.

BACKGROUND OF THE INVENTION

In general, a photographic camera using electric shutters employ such photo conductor as cadmium sulphide device for its photoelectric transducer and such as a, inevitably requires a power battery therefor, such as manganese or mercury battery which needs to be replaced upon consumption of the electric power. In lieu of such power battery, it is theoretically conceivable to make use of a photocell, namely, a photo electromotive element employed in an exposure meter and EE (electric exposure) mechanism, for the same purpose. In practice, however, output energy of a photocell is insufficient for operating the electric shutter and hence, a power battery is indispensable for photographic cameras having electric shutters. There are certain photographic cameras incorporating a power battery which is chargeable with a battery charger from outside of a camera body, but these are inconvenient particularly in that they require battery chargers in addition to the photographic cameras.

SUMMARY

In order to overcome the above-mentioned drawbacks, this invention provides a photographic camera with a photo-electric cell which is usable both as a photographing time control element for its electric shutter and as an indirect electric source for said electric shutter through devising said photocell in such a manner as to enable it to charge, by turning of a switching element, a power battery for said electric shutter. When a photocell is used as a shutter time control element, it is necessary to provide, in front of said photocell, a grid controlling incident light angles so as to limit the incident light rays to be received by the photocell to ones coming from a scene to be photographed, and a filter so as to enable spectral sensitivity of a light receptor comprising said photocell to approximate visual sensitivity of a human eye. If, however, the photocell is used as a solar battery for charging a power storage battery, it is inappropriate to cover the light receiving front face of said photocell with the aforesaid grid or filter. Under normal use, such power storage battery of a photographic camera needs to be charged only once every half a year and under such circumstances as mentioned above, the aforesaid incident light control grid and the filter must be removed to expose the light receiving face of the photocell in the direct sunshine. It goes without saying that the correct exposure is hardly obtainable if an operator forgets to restore the aforesaid grid and the filter onto the photocell after charging operation. In order to eliminate possible mishandling as mentioned above, in photographic still cameras according to this invention, removing operation of the grid and the filter is coupled with a switching movement of the photocell circuit from a photographing status to a charging status (a status of charging the power storage battery) so that either the shutter release lever is stopped with a member coupled with such switching movement, or a warning member coupled with such switching movement is adapted to appear in the viewfinder so as to warn the operator that the camera is not ready for taking pictures. Instead of coupling the aforesaid switching movement of the photocell circuit with the removing operation of said grid and the filter from the light receiving face of said cell, the grid and the filter can be designed such that they will directly cover the viewfinder as they are uncovered from the front face of the photocell.

Another object of this invention is to provide a photographic camera having an electric shutter, in which a movable piece of the aforesaid switching element which charges the photocell either for photographing or for charging use is coupled, irrespective of the movement of the grid and the filter, directly with the movement of the shutter release lever, said movable piece being normally adapted to be connected to a charging side, except in the event the shutter release lever is operated, said movable piece is switched to the photographing side against its habitude so as to enable the photocell to be connected to the electric shutter circuit to operate as a photographing time control element. In this instance, inasmuch as the photocell is constantly held, except when a shutter button is pressed, in a status of charging the power battery of the electric shutter, irrespective of the movement of the movement of the aforesaid grid and the filter, to move a switching element for charging the battery becomes unnecessary, thereby enhancing efficiency.

BRIEF DESCRIPTION OF THE DRAWINGS

FIGS. 1, 2 and 3 are perspective views of photographic cameras respectively illustrating different example embodiments of this invention.

FIG. 4 is a perspective view, showing interlocking relation of a light receptor, a switching element and a shutter release lever.

FIG. 5 represents a longitudinal section of a light receptor incorporated in a photographic camera according to this invention.

FIG. 6 is a perspective view illustrating interlocking relations of a light receptor, a switching element, a warn- the mark and an optical system of a viewfinder in the photographic camera embodying the present invention.

FIG. 7 is a scene visible through the viewfinder when a power battery is in charged status.

FIG. 8 is a schematic circuit diagram illustrating connection of a switching means according to this invention, in which a photo-electric cell is connectable, as the case may be, either to an electric shutter circuit or to a circuit for charging a power battery of said electric shutter.

DESCRIPTION OF THE PREFERRED EMBODIMENTS

Further objects of the invention will be apparent from the following description taken in connection with the accompanying drawings. As is readily apparent from FIGS. 1, 2 and 3 which respectively represent perspective views of photographic still cameras, illustrating various embodiments of the present invention in a photographing status, a light receptor provided adjacent to a photographic lens 2 in the front face of the camera body 1 comprises a photocell 3 built in the camera body, an incident light angle control grid 4 which limits the incident light rays received by the photocell to those directed from the scene to be photographed, and a filter 5 which is superposed with the aforesaid grid and the photocell and adapted to proximate the spectral sensitivity of the aforesaid photocell to the visual sensitivity of a human eye, all of said constituent members of the light receptor being housed in a framed holder 6. As shown in FIGS. 4 and 6, the top and bottom or the lateral ends of said framed holder 6 form a protruded rail 6a which is adapted to fit in a guide groove 7 so that front face of the photocell is freely slidable therein.

The cross section of said framed holder 6 forms a U shape as shown in FIG. 5, with an external face of one of its bent portions being pressed, as shown in FIG. 4, against a movable piece of a switching element 8. Inside of the other bent portion of said framed holder 6 is provided a bent tip 9a (FIG. 5) on the free end of a lever 9 which is secured, at a fulcrum thereof, to the camera body, so that, when the aforesaid framed holder 6 is extracted and moved to a position (shown in a dotted line in FIGS. 1, 2 and 3) outside of the front face of the photo-electric cell, the lever 9 is adapted to be pushed against the inner side of the other bent portion of the U shape framed holder 6 and slide to a position corresponding to a stopper pin 11 provided at the lower portion of a shutter release lever 10. Therefore, when the framed holder 6 incorporating the incident light angle control grid 4 and the filter 5 is moved to a position shown in dotted line in FIGS. 1, 2 and 3, the movable piece of the switching element 8 converts, without fail, the electric circuit from a photographing status to a charging status, instantaneously oscillating the lever 9 which is coupled with the movement of the aforesaid movable piece into the movement path of the shutter release lever 10, thereby stopping the downward movement of the lever.

The movement of the aforesaid holder 6 housing the incident light angle control grid 4 and the filter 5 can also be utilized as shown in FIG. 6 in such a manner as to enable a warning mark to appear in a viewfinder of photographic cameras. An optical system as shown in FIG. 6 is of a clairvoyant viewfinder of reverse Galileo telescopic type known in the art, in which 12 represents an objective lens, 13 is an eyepiece, 14 is a semi-reflecting mirror which envisages in the visible scene of the aforesaid clairvoyant viewfinder the light rays transmitted from a mask plate 15 through a mirror 16; 17 is a light path compensating lens. In a suitable position between said mask plate 15 carrying a bright frame which indicates the scene actually photographed on a film, and the framed holder 6 housing the aforesaid grid 6 and the filter 5, is provided a bell crank 18 whose fulcrum is pivoted on the camera body by a stud 19. One arm 18a of said bell crank 18 is urged to rotate in a clockwise direction by the elasticity of a spring which is secured, at its one end, to the camera body, said arm 18a being provided, at an extremity thereof, with a warning plate 20 which is movable to suitably overlap with a light receptive aperture 15a provided on the mask plate 15. The warning plate 20 is preferably made of a colored transparent plate or a plain transparent plate with warning letters such as "NO." An extremity of another arm 18b of said bell crank 18 is provided with a pin 21 piercing therethrough which rests, at its one end, on the bent portion of the aforesaid U shaped holder 6, while the other end of said pin 21 being pressed against the movable piece of the electric circuit switching element 8. In mechanism as hereinabove described, when the framed holder 6 as in FIG. 6 is moved upward, the bell crank 18 is pushed up by the bent portion of said holder 6 and rotated clockwise around its fulcrum, converting the switching element 8 of the electric circuit from a photographing position to a charging position and contemporaneously moving the warning mark 20 into the visible scene of the viewfinder as shown in FIG. 7, thereby warning the operator that the photographing operation is rendered ineffective.

An electric shutter used in the present invention and an example of an electric circuit for charging a power battery for said electric shutter is hereinafter described, taking for explanatory purpose, such curtain shutter as a focal plane shutter comprising a leading curtain and a follower curtain.

In the circuit diagram shown in FIG. 8, symbols $Tr1$ and $Tr4$ respectively represent an amplifying transistor and a transistor used in a switching element for photographing time control. B is a chargeable power accumulator such as nickel cadmium alkalide battery. M is an electro-magnet adapted to attract the follower curtain of the shutter. S1 is a main switch which is adapted to be closed by the operation of a shutter release lever. S2 is a switch which is adapted to be opened by the running movement of the leading curtain of the shutter and closed by the similar movement of the follower curtain of the same. By the opening and closing movement of said switch S2, charging and discharging of electricity takes place in an electric condenser C connected parallel with said switch. As known to those skilled in the art, the the charging and discharging time (in this instance, the charging time) controls the photographing time, while each of the resistors R regulates the operative electric voltage of the aforesaid transistors $Tr1$, $Tr2$ through $Tr4$. Between an emitter pole of the first stage transistor $Tr1$ of said electric shutter circuit and the positive pole of the aforesaid power battery B is inserted, through a switching element 8, a photocell 3 such as solar cell. The aforesaid switching element 8 carries bipolar double flow switching terminals so that, when the frame holder 6 housing the aforesaid grid and the filter 5 is moved, the movable piece of the switching element 8 takes a position shown in the dotted line, thereby connecting the aforesaid photocell 3 with both poles of said power battery B through a reverse current preventive diode D, thus forming a charging circuit.

If, however, the front face of the photocell 3 is covered with the holder 6 housing the grid 4 and the filter 5, the switching element 8 takes a position shown in a continuous line in FIG. 8, connecting the photocell 3 to the emitter pole of the first stage transistor $Tr1$, thereby constituting an electric shutter circuit. In this instance, upon pressing of the shutter release lever, the aforesaid main switch S1 is closed, enabling the power battery B to supply electric current to the circuit, the leading curtain of the shutter to run instantaneously and the switch S2 to open. The follower curtain, however, is attracted by the electromagnet M connected to transistors $Tr1$ and $Tr4$ which have become conductive status by the closing of the main switch S1. Furthermore, the photocell 3 provides the emitter pole of the transistor $Tr1$ with electromotive force corresponding to photographing light, causing electric current to be supplied to the transistor $Tr1$ from the power battery B, thereby starting to charge the condenser C. In other words, exposure of the photo sensitive film is thus initiated. When the terminal voltage of the condenser C is raised to an operating point of the base potential of the transistor $Tr2$, the electric current flow to transistors $Tr3$ and $Tr4$ is interrupted, causing electric current to flow to the transistor $Tr2$. When the electric current flow to the transistor $Tr4$ is interrupted, the flow to the electromagnet M which had been attracting the follower curtain of the shutter is also interrupted, causing said follower curtain to initiate its running movement, closing switch S2 and thus completing photographing operation. In order to charge the aforesaid battery B, the holder 6 is pulled out from over the light receiving surface of the photocell 3, causing the aforesaid switching element 8 to move to a position shown in dotted line in FIG. 8 which, in turn, connects said photocell 3 to both ends of said battery B through an irreversible diode D. Light ray and in particular the direct sunshine received on the light receiving surface of the photocell 3 causes said photocell to supply electricity to the aforesaid battery B, thereby charging the latter.

In this instance, if the abatement of the power of the battery B and the electromotive force of the photocell are small, it is likely that the electric current is reversively supplied from said battery B to the aforesaid photocell. It is for the purpose of preventing such reversive current that diode D is inserted as hereinabove described.

As obvious from the above description, in photographic cameras according to the present invention, in addition to the fact that a photocell incorporated therein is usable, by a simple turn of a switching element, both as a light receiving element in the electric shutter circuit and as a charger for the power storage battery of said circuit, motion of a moveable piece of the aforesaid switching element 8 is adapted to be actuated by the movement of a framed holder 6 housing an incident light angle control grid 4 and a filter 5, movement of said holder 6 actuating, on the other hand, a stopper member 9 (refer FIG. 4) for a shutter release lever 10 which is constructed as shown in FIG. 4 and further regulating the movement of a member 18 which moves a warning mark into the scene visible in the viewfinder. Furthermore, in the present invention, in addition to coupling the movement of the aforesaid frame holder 6 (the aforesaid incident light angle control member 4 and the filter 5) out from over the surface of the photocell, with converting action of a switching element 8 from a photographing position to a charging position, the holder 6 may be so constructed as to directly cover the viewfinder window of the camera. Further, by providing a movable piece of the switching element 8 with an elastic habitude so as to keep said movable piece, under normal circumstances, in contact with fixed terminals on the charging side and by further coupling the motion of said movable piece with the movement of a shutter release lever, pressing of a shutter button is adapted to press the aforesaid movable piece down on the photographing side of the electric shutter circuitry, thereby rendering said circuit normally in a charged status irrespective of the frame holder, concurrently keeping the voltage of the power battery constant.

In comparison with conventional photographic cameras using dry cells or merely batteries, or those requiring additional separate battery chargers, the present invention provides a photographic camera with an electric shutter of semi perpetual life whereby correct exposure is always ensured for taking pictures by eliminating possible erroneous operations which may be caused by the photocell being used for the heretofore mentioned dual purposes.

I claim:

1. In a photographic camera of the character described, an electric shutter, a battery to supply current for said shutter, a photo-electric cell adapted to control said shutter or to charge said battery; a removable filter for said cell, switching means operable upon movement of said filter to electrically connect said cell to said battery when said filter is moved to inoperable position and to electrically connect said cell to said shutter when said filter is in operable position.

2. A camera according to claim 1, including means operable upon movement of said filter to inoperative position to prevent operation of said shutter.

3. A camera according to claim 2, wherein said last mentioned means comprises a locking lever actuated by said filter to prevent manual actuation of a shutter release lever.

4. A camera according to claim 1, wherein movement of said filter to inoperative position serves to move a warning device into view in the viewfinder of the camera.

5. In a photographic camera of the character described, an electric shutter, a battery adapted to furnish current for said shutter and a photo-electric cell adapted to exercise a photographing control of said shutter depending on the light intensity striking said cell and also adapted to generate current to charge said battery, a movable grid for said cell, means for alternatively positioning said grid in an operable or in an inoperable position on said cell, a switch operable by movement of said grid and adapted to electrically connect said cell to said electric shutter and in another position thereof to connect said cell to said battery for charging the latter, means for operating said switch when said grid is moved in relation to said cell, locking means activated by removal of said grid from said cell to prevent operation of said shutter.

6. In a photographic camera of the character described, an electric shutter, a battery to supply current for the operation of said shutter, a photo-electric cell for shutter control electrically connected to said battery, the combination of a removable electro-photo cell grid and filter for said cell, electric switch means for connecting said cell to said shutter circuit when said grid and filter are in operable position in relation to said cell, said switch means electrically disconnecting said cell from said shutter and connecting it to said battery for the charging thereof when said grid and filter are moved to inoperable position with respect to said cell, and means operable by the movement of said grid and filter to inoperable position to prevent manual actuation of said shutter while said to prevent manual actuation of said shutter while said cell is connected to said battery for the charging thereof.

References Cited

UNITED STATES PATENTS

| | | | |
|---|---|---|---|
| 2,919,353 | 12/1959 | Paradise | 250—212 |
| 3,205,803 | 9/1965 | Burgarella et al. | 95—10 |
| 3,245,332 | 4/1966 | Kagan | 95—10 XR |
| 3,259,043 | 7/1966 | Pagel | 95—11.5 |
| 3,296,949 | 1/1967 | Bounds | 95—11 |

NORTON ANSHER, Primary Examiner

F. L. BRAUN, Assistant Examiner

U.S. Cl. X.R.

95—11.5; 240—10.6; 250—212

PO-1050
(5/69)

UNITED STATES PATENT OFFICE
CERTIFICATE OF CORRECTION

Patent No. 3,485,152      Dated December 23, 1969

Inventor(s)      Zyoichi Fuwa

It is certified that error appears in the above-identified patent and that said Letters Patent are hereby corrected as shown below:

Column 1, line 16, "said" should read -- the --; Column 2, line 38, remove "of the movement"; line 56, "the" should read -- ing --. Column 6, remove line 46.

SIGNED AND
SEALED
JUN 16 1970

(SEAL)
Attest:

Edward M. Fletcher, Jr.
Attesting Officer

WILLIAM E. SCHUYLER, JR.
Commissioner of Patents